United States Patent [19]

Valdes

[11] 4,340,910
[45] Jul. 20, 1982

[54] CRT SPOT SUPPRESSION CIRCUIT

[75] Inventor: Silverio A. Valdes, Alexander, N.Y.

[73] Assignee: GTE Sylvania Incorporated, Seneca Falls, N.Y.

[21] Appl. No.: 78,421

[22] Filed: Sep. 24, 1979

[51] Int. Cl.³ .................. H04N 5/68; H01J 29/96; H02H 7/20
[52] U.S. Cl. .................................. 358/243; 315/3; 328/10
[58] Field of Search .................... 315/381, 384, 3; 358/242, 243, 64–66, 184, 188, 33; 328/10, 8; 361/56, 91; 307/285, 318

[56] References Cited

U.S. PATENT DOCUMENTS 4,056,758 11/1977 Schaas .................................. 315/384

FOREIGN PATENT DOCUMENTS 2423726 11/1975 Fed. Rep. of Germany ...... 315/384

Primary Examiner—John C. Martin
Attorney, Agent, or Firm—John A. Odozynski

[57] ABSTRACT

In a CRT system having a cathode coupled to a source of first potential voltage and a control grid biased negatively with respect to the cathode, means coupled between a source of second potential voltage and control grid for superimposing negative-going transitions in the second potential voltage upon the control grid so as to suppress the appearance of spots upon the face of the CRT subsequent to the de-energization of that system.

4 Claims, 1 Drawing Figure

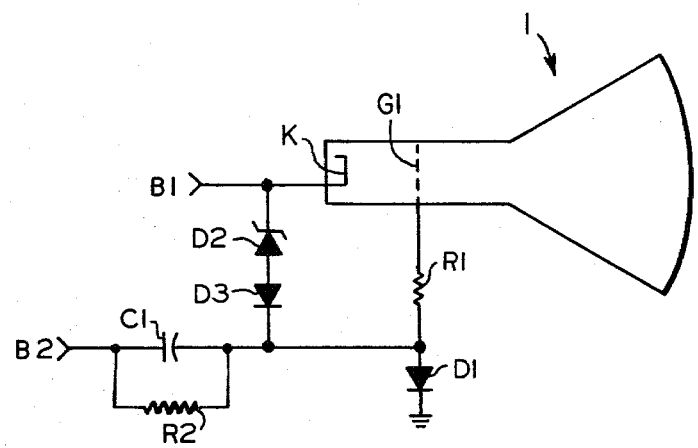

CRT SPOT SUPPRESSION CIRCUIT

TECHNICAL FIELD

This invention relates to CRT (cathode ray tube) systems and more particularly to circuitry for suppressing the appearance of spots on the CRT screen as the system is de-energized.

BACKGROUND ART

As is well known the minimum elements of a CRT system are a reference electrode, or cathode, a control electrode, or grid, and an anode. When the system is energized the voltage at the control grid is typically negative with respect to the cathode and the voltage at the anode is very positive with respect to the voltage at the cathode. In a television receiver the voltage between the cathode and grid may be on the order of $-100$ volts and the voltage between the cathode and anode may be on the order of $+25$ Kvolts. When the receiver is de-energized, some time will elapse before the anode voltage decays and, if the anode voltage decays more slowly than does the scan of the electron beam across the CRT, the beam current will be concentrated on a small area, or spot, on the face of the CRT. If excessive, the increased current density in that area will result in brightness sufficiently intense to damage (i.e. burn off) the luminescent phosphor on the screen of the CRT. This invention is directed to a reliable and cost-effective means for suppressing such spots upon de-energization of the receiver.

BEST MODE FOR CARRYING OUT THE INVENTION

The invention is a spot-suppression circuit for a CRT system characterized by a reference electrode coupled to a first potential voltage and a control electrode biased to a second, more negative potential. The circuit includes means coupled between the reference and control electrodes for superimposing negative-going transitions in the second potential voltage upon the control electrode. The circuit suppresses spots that otherwise might appear on the face of the CRT as that system is de-energized.

BRIEF DESCRIPTION OF THE DRAWING

The sole drawing is a schematic diagram of the subject CRT spot suppression circuit.

DISCLOSURE OF THE PREFERRED EMBODIMENT

For a better understanding of the present invention, together with other and further objects, advantages and capabilities thereof, reference is made to the following disclosure and appended claims in connection with the above-described drawing.

Referring now to the drawing, CRT 1 includes a reference electrode, or cathode, K, and a control electrode or grid, G1. The cathode is coupled to a first source of potential voltage, B1. The grid is coupled through a series-connected resistor, R1, and diode, D1 to ground. The junction of R1 and D1 is coupled through a parallel-connected capacitor, C1, and resistor, R2, to a second source of potential voltage, B2. Although it may not be necessary for all CRTS, a breakdown device such as a zener diode, D2, is coupled between the cathode and the junction of R1 and D1. D2 serves to maintain the voltage difference between the cathode and grid below the breakdown value. Another diode, D3, is connected in series, anode-to-anode, with D2 and prevents current from flowing through D2 in the anode-to-cathode direction.

Operation is as follows. After the receiver is energized, B1 and B2 will assume their quiescent values. C1 will be charged through D1 to a voltage substantially equal to the value of B2 and the grid will become negatively biased by an amount equal to $B1-V_{D1}$, where $V_{D1}$ is the voltage drop across D1.

Normally no current will flow in the grid because it is negatively biased with respect to the cathode. Should the voltage on D1 tend to become more than approximately 0.6 volts positive with respect to ground, D1 will become conductive. Under conditions in which electrons emitted by the cathode accumulate on the grid, the grid will become negatively charged and the desired bias will be disturbed. R2 tends to offset this small amount of current flow. The current that circulates through R2 cancels any grid current and the balance of current through R2 circulates through D1, rendering D1 conductive and clamping the grid bias to approximately 0.6 volts. The value of R2 should be as high as possible, given the value of B2, to supply sufficient current to D2 to render that diode conductive. In a specific embodiment where the value of B2 was 220 volts, 4.7 Mohms was found to be an effective value for R2. R1 is included to limit grid current that may result from inter-electrode arcing of the CRT. A practical value for R1 is in the range of 1 Kohm.

When the receiver is de-energized both B1 and B2 will begin to decay toward ground. The negative transition in B2 will be capacitively coupled through C1 to the grid. The grid will therefore remain sufficiently negatively biased so as to preclude the possible flow of beam current.

As can be appreciated from the above, the subject invention represents a simple, and therefore cost-effective, yet reliable means for suppressing spots that may possibly occur on the screen of a CRT when the CRT is de-energized.

Accordingly, while there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

The invention is useful in display systems and other types of equipment utilizing cathode ray tubes.

What is claimed is:

1. In a cathode ray tube system having a reference electrode coupled to a source of first potential voltage and a control electrode biased negatively with respect to the first potential voltage, spot-suppressing means coupled to a source of second potential voltage and the control electrode for superimposing negative-going transitions in the second potential voltage upon the control electrode so as to suppress spots on the face of the cathode ray tube system when that system is de-energized, said spot-suppressing means comprising breakdown means coupled between the reference electrode and the control electrode.

2. Spot-suppressing means as defined in claim 1 comprising a capacitance coupled between the source of second potential voltage and the control electrode.

3. Spot-suppressing means as defined in claim 2 further comprising diode means coupled between the control electrode and a reference potential.

4. Spot-suppressing means as defined in claim 3 wherein said breakdown means comprises a zener diode.

* * * * *